Dec. 7, 1965  C. S. BATCHELOR ETAL  3,221,853
FRICTION DEVICES
Filed Aug. 29, 1962  2 Sheets-Sheet 2
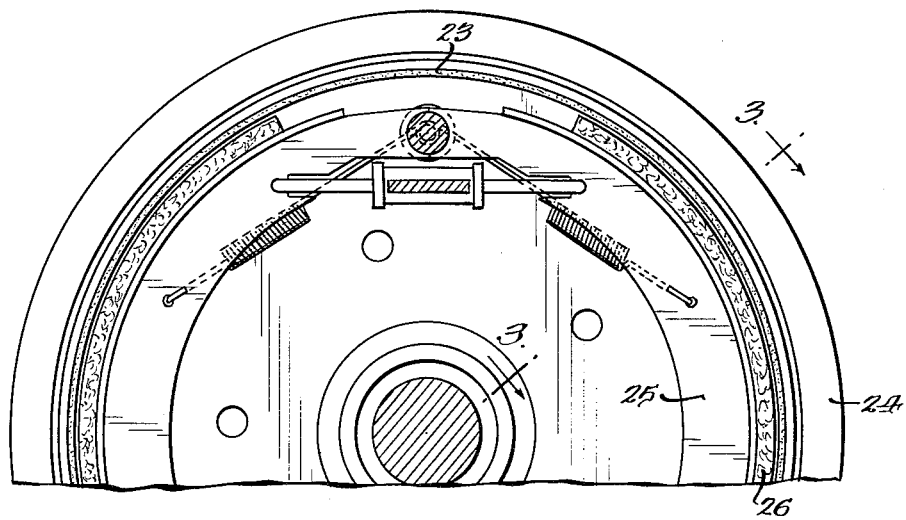
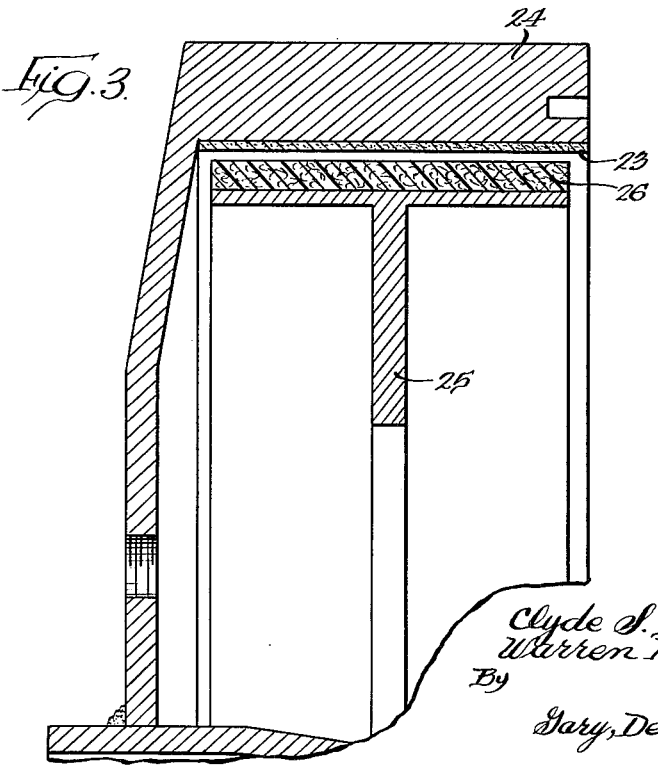
INVENTORS:
Clyde S. Batchelor
Warren R. Jensen
By
Gary, Desmond & Parker
Attys

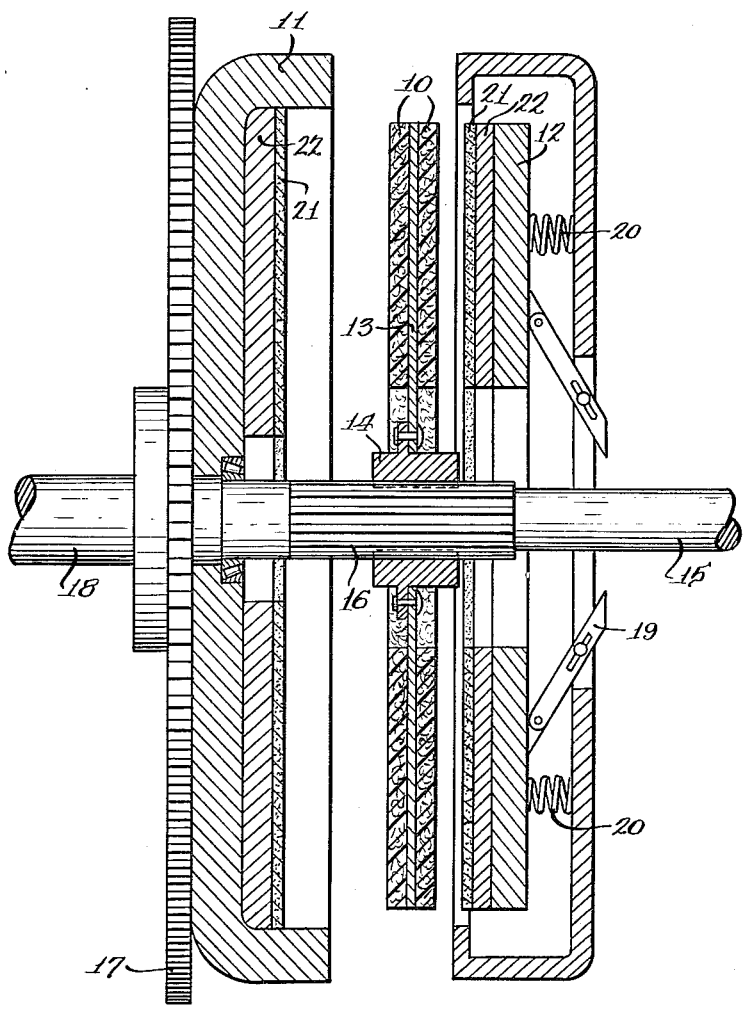

United States Patent Office 3,221,853
Patented Dec. 7, 1965

3,221,853
FRICTION DEVICES
Clyde S. Batchelor, Trumbull, and Warren R. Jensen, Stratford, Conn., assignors to Raybestos-Manhattan, Inc., Passaic, N.J., a corporation of New Jersey
Filed Aug. 29, 1962, Ser. No. 220,282
11 Claims. (Cl. 192—66)

This invention relates to automotive and industrial friction devices designed for connecting and disconnecting at will two mechanical parts adapted for transmitting torque or power from one part to the other when the parts are connected, generally designated as clutches and automatic transmissions, and to friction devices designed for retarding or arresting the motion of a vehicle or mechanism with which the device is associated, generally designated as brakes.

The present invention is particularly concerned with the friction couples for the aforesaid devices comprising a metal mating component of high heat-conductive character, and a fiber-reinforced hardened organic binder containing friction material composition lining member, and specifically the former component and its cooperative relationship to the latter.

Thus, for example, a friction mechanism of the foregoing class in general comprises a support and at least a pair of elements mounted for relative rotational movement thereon and for bodily movement of one toward the other, and where the composition lining as aforesaid is mounted on one of said elements and a metallic mating member of high heat-conductive character is mounted on the other.

It has long been recognized that copper and certain alloys thereof, due to their high heat-conductive character, would be desirable as a metal mating element in friction couples of the class heretofore described. However, due to its softness and low yield point at the surface temperatures produced by even moderate usage, they have for such reason been found commercially uneconomical and not feasible except in instances where the high heat-conductive metal was provided with liquid cooling means, for example, such as described and claimed in Sanford Patent 2,821,271, and others.

Copper and its alloys as aforesaid, for example, even harder alloys of copper such as 1% chromium-copper and cadmium-copper, even when used against soft or highly graphitized friction linings becomes scored and at least the upper layers near the friction surface become plastic usually becoming erose with displacement of metal and frequently transfer to the friction lining material.

It is an object of the present invention to employ copper and high heat-conductive alloys thereof such as, for example, those having a melting point of at least 1500° F. and a thermal conductivity of at least 40% of that of pure electrolytic copper without necessity for employment of cooling liquid and which yet withal will remain stable and wear well for the purposes hereinbefore and hereinafter described.

It has been found that we can increase the "apparent or effective hardness" and resistance to plastic flow of copper and its alloys as aforesaid by uniform distribution with or incorporation in the matrix of copper as aforesaid, from about ½ to about 25% by volume of inorganic non-metallic particles of a Mohs' scale hardness greater than 7, and by applying said mixture to the operative surface of the mating member of a friction couple composed of such base metallic materials as cast iron, aluminum, steel, etc. or metals commonly used as heat sinks in the conventional drum and disc brakes and clutches.

The term "apparent hardness" as used herein may be explained as follows: If substantially pure copper is checked by conventional means it will have a Mohs' scale hardness of approximately 3.5 and a Rockwell hardness of approximately F-50 to approximately B-40. If this copper is then run against conventional friction lining material it will score and wear badly. However, if this same copper has, for instance, dispersed uniformly throughout it in quantities of from about ½ to about 25% by volume of $Al_2O_3$ of a particle size all of which passes through a 600-mesh sieve, the Mohs' scale and Rockwell hardness will be substantially as above at room temperature but at elevated temperatures; the hardness and the hot yield in compression will be much greater than pure copper wth yield points in compression showing little drop off at temperatures nearing the M.P. of copper (1980° F.) and in running against conventional friction linings no scoring or excessive plasticizing will take place. It is believed that this is because the lining is being supported by the hard $Al_2O_3$ particles while the copper merely acts as a thermal sponge to absorb and remove the heat from the friction track.

Very broadly, the present invention therefore is directed to a metal friction mating member having attached to its operative surface a highly heat-conductive layer composed of a matrix of copper, or its alloys as aforesaid, having dispersed therein pulverulent refractory material in an amount to prevent scoring and plasticizing of the metal friction track and to prevent undue wear of the cooperative composition friction lining which is generally composed of a fiber reinforced hardened organic binder material.

In a specific embodiment of the present invention a layer of highly heat conductive copper or copper alloy is interposed between the copper-refractory particle wearing surface layer and the steel, aluminum or the like metal backing or support member, said intermediate layer acting as a heat sink.

Other objects and advantages of the present invention relating to its details of construction, arrangement of parts, and economies thereof, will be apparent from a consideration of the following specification and accompanying drawings wherein:

FIG. 1 diagrammatically illustrates in section a clutch embodying the present invention.

FIG. 2 diagrammatically illustrates a fragmentary section of an internally expanding cylindrical brake embodying the present invention.

FIG. 3 is a section on line 3—3 of FIG. 2.

In conventional mechanical clutches commonly used on trucks, buses, hoists, earthmoving equipment, etc. there are many variants but the simplest form is diagrammatically illustrated in FIG. 1 which comprises a pair of friction faces 10, 10 acting as a driven member and a flywheel 11 and a pressure plate 12 acting as driving members. The friction faces which are composed of conventional fiber reinforced hardened organic binder friction composition lining material are in the form of annular discs and bonded to the annular metal supporting disc 13 carried by the hub member 14, and adapted for axial movement of the drive shaft 15 on its splined portion 16. The flywheel 11 is associated with the starter gear 17 and the conventional crank shaft 18. The clutch is engaged by release of pressure on the clutch pedal through the releasing links 19 which allows springs 20, which have been contracted, to move axially and bring pressure through the floating disc facings 10, 10 on both the flywheel and pressure plate, which pressure, after the desirable momentary slip, causes the friction linings 10, 10 to rotate with the flywheel and transmit power to the drive shaft.

Clutches in general are signed to operate as friction couples in accelerating a fixed load up to a specified speed. The heat generated during the single engagement is not usually deleterious to the friction lining of the mating member. However, in many cases the cycling of the device is so rapid as to cause the overall temperature of the device to rise with correspondingly higher peak temperatures at the friction face during engagement. As the drum or disc metal temperature rises the peaks reached during an engagement can reach excessive levels causing lining wear as well as scoring and heat checking in the metal mating members.

In accordance with the present invention, the symptoms of excessive heat are eliminated or minimized by inlaying a mixture of copper and particles of hard, inorganic, non-metallic refractory material of very fine mesh size on the operative surface of the metal mating member.

Thus, as shown in FIG. 1, the operative surface of the flywheel 11 is formed by a wear layer 21 composed of a mixture of copper or copper alloy and said finely divided hard, non-metallic, inorganic refractory particle material. This composite of metal and non-metallic material is applied as by well known processes of spraying or plating either directly to the surface of the metal 11 or onto an interposed layer of metal 22. In the illustration of FIG. 1, both the flywheel 11 and the pressure plate 12 are similarly provided with a wear surface 21 composed of a copper-refractory particle composite and an interposed heat sink layer 22. However, it is not always necessary to treat both the flywheel and pressure plate in this manner or in the same manner since frequently there is little wear on one of the friction linings, usually the side towards the flywheel which sometimes per se creates a massive heat sink.

The metal or metal matrix in direct metallurgical contact with the metallic friction carrier is preferably copper and will be so referred to hereinafter, but may be any copper alloy as hereinbefore described, or restated, one having a coefficient of heat transfer greater than 1500 B.t.u. per square foot, per hour, per degree F., per inch. Silver and its alloys are functional but competitively are too high in price.

The useful inorganic, non-metallic refractory particles are carbides and ceramic or metallic oxide materials, preferably in the hardness range of greater than 8 on the Mohs' scale of hardness, although a hardness of greater than 7 shows sufficient wear resistance for use where relatively low energy is encountered. The preferred additive is classified −600 mesh alumina but −600 mesh zirconia, tungsten carbide, tantalum carbide, carborundum (silicon carbide), titanium carbide, boron carbide, crystalline aluminum silicates, thorium oxide, and the like can be used. These finely divided refractory inorganic, non-metallic particles are employed in proportions of from about ½ to about 25% by volume of the composition, and as previously indicated are directly bonded to the metallic supporting members, and comprise the wearing surface thereof, by known plating techniques or by simultaneous spraying of the molten copper and the finely divided inorganic particle material, so that they become bonded to the metallic support in a manner wherein the copper becomes the matrix substantially enveloping the inorganic particle material.

In the practice of the present invention it has been found that a friction surface of a few thousandths inch or more of thickness and which contains for example about 6% by volume of fine refractory in a copper matrix sprayed or plated by commercial procedures produces a surface which resists abrasion and spectacularly reduces plastic flow. While heat conductance is reduced slightly by the abrasive additive, this is only so in approximate algebraic relationship to its percent by volume.

It is believed that all of the physical properties at high temperature of the copper in the wear layer are greatly increased by the refractory particle additives which is thus believed to account for its resistance to plastic flow and apparent hardness.

Brinell tests were run in the range of 75° F. to 1000° F. and it was found that copper was slightly harder at room temperature than a copper containing 3.5% by volume of finely dispersed alumina. At 200° F. this hardness advantage had disappeared and at 1000° F. the refractory particle bearing copper still had appreciable hardness (25 Brinell) and was more than twice as hard as the pure copper. After the conclusion of the tests, the pure copper had grain growth and was fully annealed. The 3.5% alumina-copper after test increased about ten points in Brinell indicating a definite although slight degree of dispersion hardening. The dispersion hardening and inherent keying of the metal by refractory particles undoubtedly are contributors to the effectiveness of the invention.

In the illustration of FIG. 1, the underlay 22 next to the cast iron components 11 or 12 may comprise a sprayed copper layer of for example about .090 inch thickness, and the wear surface layer 21 may be composed of the sprayed composite of copper and about 4% by volume of −600 mesh classified alumina of .030 inch thickness.

The heat sink layers 22 in the alternative can be composed of rolled copper sheet brazed to the underlying cast iron supports 11 or 12 and sprayed with an admixture of copper and 6% by volume of −600 mesh classified alumina to provide wear surface 21 of a thickness of about .010 inch.

As an alternative, the wear layers 21 can suitably be prepared by plating with copper and 4% by volume of −600 mesh alumina which produces deposits of very uniformly dispersed finely divided refractories within the copper matrix.

As previously indicated, the heat sink layers 22 may be entirely eliminated and the wear layers 21 directly applied to the metal bases 11 or 12 in sufficient thickness to perform the dual function of a heat sink and a wear layer and for the purpose of illustration this is shown with reference to the cylindrical brake drums in FIGS. 2 and 3.

Thus, the wear layers 21 in FIG. 1 or the wear layers 23 of FIGS. 2 and 3 can be suitably directly applied to either the pressure plate 12, the flywheel 11, or to the brake drum 24. It will, of course, be understood that in the arrangement of the cylindrical brake drum of FIG. 2 wherein the brake drum 24 is suitably composed of aluminum, heat sink layers of copper metal as described with respect to the clutch of FIG. 1 may also be interposed between the operative surface layer 23 and the aluminum brake drum 24 of FIGS. 2 and 3.

A suitable example of the wear layer 21 or 23 without interposed heat sink is one composed of sprayed copper containing 3% by volume of −600 mesh zirconium oxide to a thickness of .125 inch, this thickness being suitable for use as both a frictional wear zone and a heat sink.

FIGS. 2 and 3 show a conventional brake drum or friction couple composed of the aluminum brake drum 24, in this case having a copper-refractory wear surface layer 23 and brake shoes 25 carrying fraction composition lining 26 for cooperative engagement with the brake drum.

Aluminum brake drums of common mold or die casting formulations may be made operable in accordance with the present invention by spraying a copper underlay with the conventional wire or powder guns to a thickness of .020″–.060″ followed by a sprayed overlay of copper and 10% by volume of −600 mesh alumina to a finished thickness of about .005–.030 inch.

A high performance car of a type used by police for pursuit cars was equipped with aluminum drums which had been undercut in diameter to allow for a .060″ layer of copper and a finished wearing layer of sprayed copper with 6% by volume of added 600-mesh crystalline alumina about .010″ in thickness after finish machining to diameter. No special surface finish is required although for reasonable appearance a finish of 120 or better is desired.

These drums were subjected to car test involving 40 and 60 m.p.h. stops at 20′ per sec.² and 12′ per sec.², respectively. Performance curves were run at 30, 60 and 80 m.p.h. following which 8 fade stops were made at 70 m.p.h. at rapid time intervals of 50 sec. and, additionally, 16 stops from 50 m.p.h. at a deceleration of 18 ft. per sec.² at a .2 mile interval. A like test had previously been run on the standard cast iron drums which weighed 3½ lbs. more than the aluminum drums. The same lining combinations were used in both tests.

The performance curves on the aluminum drums were about 10% higher than on the cast iron drum. On the 70 m.p.h. fade, the line pressure to obtain 18 ft. sec.² increased from 520 p.s.i. initially to 1500 p.s.i. at stop 6 on the cast iron drums at which point the test was stopped. On the same 70 m.p.h. fade, the aluminum drums produced an initial pressure of 340, peaked at 480, and on the eighth stop was 360 which is excellent fade resistance. The 50 m.p.h. 18-stop fade when run with cast iron started at 440-line pressure and climbed steadily to 1100 p.s.i. at stop 13, rose to 1200 at stop 14 and dropped slightly to 1150 at the eighteenth stop. The aluminum drum test started at 350 p.s.i. and climbed slowly to 550 at stop 16 at which point the test was stopped due to drum expansion which caused the pedal to rest on the floor board. Average wear was .0096″ for the test for the cast iron drums and .008″ for the aluminum drum. The aluminum drums were 3½ lbs. lighter and were not ribbed (like conventional drums) which would have lowered the overall temperature and given a more spectacular improvement in wear.

In spite of this, the stability of the friction was very exceptional and the higher friction consistently found was probably an indication of the cooler contacting surfaces.

Further examples of the present invention comprise brazing a copper sheet ⅛″ thick to the operative surface of a steel pressure plate. This is prepared for metal spraying by roughening and by machining or shot blasting and then sprayed with .040″ of copper and approximately 12% by volume of −600 mesh crystalline alumina and then surface machined to 120 micro finish or better. A cast iron plate was treated in the same manner. Similarly, an aluminum base was prepared for metal spraying and sprayed with copper and 18% by volume of −600 mesh zirconium oxide to a thickness of .150″ and then finish machined to ⅛″ in thickness. An aluminum base was prepared similar to the foregoing but first sprayed with .100″ of pure copper and a zirconia-copper wear layer applied therefor by spraying.

A copper interlay of .125″ thickness was brazed to a steel base and then plated to provide a wearing layer of copper containing 24% by volume of −600 mesh alumina to a thickness of about .005″.

Although a wear resistant surface may be accomplished by spraying by making the entire heat sink a wearing material containing the hereinbefore described finely divided particles of refractory material, it is preferable to use dual layers in which only a sufficient wear resistant surface thickness is added to prevent scoring and plasticizing.

Thus, in the case of sprayed copper and sprayed copper-refractory, for example, because of the erose copper-sprayed underlay a minimum thickness of .015″ is desired after machining. When the wear resistant layer is copper with finely dispersed refractory such as zirconia plated in accordance with commercial processes, the surface layer need not exceed about .010″ and may be little more than flash plated onto a rolled copper sheet interlay or a sprayed interlay with a suitable machined surface for plating.

The preferred ranges of refractory particle addition is in the range of about ½ to about 15% by volume. The effectiveness of the additive increases very rapidly up to about 2% by volume, and thereafter slowly reaches an indefinite optimum at 9–15% by volume. Above 15%, the probability of segregation and scoring becomes so great that unless the material is plated there is an upper practical limit. Plated material tends to be much more evenly dispersed and a maximum of about 25% by volume works satisfactorily from a scoring standpoint but the loss of conductivity due to the large volume of refractory particles becomes definitely noticeable.

The overall thickness of the heat conducting and/or wear resistant overlay may be very thin for low, or what might be termed normal operations, but in the relatively high energy range thicknesses of 1/16″ and preferably ⅛″ or more are preferable.

Although we have shown and described preferred embodiments of our invention it will be understood by those skilled in the art that changes may be made in the details thereof without departing from its scope as comprehended by the following claims.

We claim:

1. In a friction mechanism, a friction couple comprising a pair of elements adapted for relative rotational movement on mounting means therefor, a fiber reinforced, hardened organic binder friction composition lining of relatively low heat conductivity secured to and supported on one element of said couple, another element of said couple comprising a metallic mating member carrying on a surface thereof a facing layer of relatively high heat conductive metal material having dispersed therein finely divided refractory inorganic, non-metallic particles selected from the group consisting of crystalline alumina, silicon carbide, zirconium oxide, tungsten carbide, tantalum carbide, titanium carbide, boron carbide, crystalline aluminum silicates and thorium oxide, and having a Mohs' scale hardness of greater than 7 positioned for frictional engagement with the surface of said lining the metallic material in said facing being selected from the group consisting of silver, copper and alloys of said metals having a melting point of at least 1500° F. and a thermal conductivity at least 40% of that of pure electrolytic copper.

2. The friction mechanism of claim 1, wherein the non-metallic particles comprise from about 0.5% to about 25% by volume of said high heat conductive metal layer.

3. The friction mechanism of claim 1 wherein the non-metallic particles are of a size of which all pass through a 600 mesh sieve.

4. The friction mechanism of claim 1 wherein the metallic material in said facing is composed of copper.

5. The friction mechanism of claim 1 wherein the non-metallic particles are crystalline alumina.

6. The friction mechanism of claim 1 wherein the non-metallic particles are silicon carbide.

7. The friction mechanism of claim 1 wherein the non-metallic particles are zirconium oxide.

8. The friction mechanism of claim 1 wherein the non-metallic particles are tungsten carbide.

9. The friction mechanism of claim 1 wherein a layer of metal is bonded between said facing and said metallic mating member, said layer of metal being selected from the group consisting of silver, copper and alloys of said metals having a melting point of at least 1500° F. and a thermal conductivity at least 40% of that of pure electrolytic copper.

10. A metallic mating member for a friction couple, said member carrying on a surface thereof a layer of relatively high heat conductive metal matrix selected from the group consisting of silver, copper and alloys of said metals having a melting point of at least 1500° F. and a thermal conductivity at least 40% of that of pure electrolytic copper, having dispersed therein from about 0.5% to about 25% by volume of finely divided refractory, inorganic non-metallic particles selected from the group consisting of crystalline alumina, silicon carbide, zirconium oxide, tungsten carbide, tantalum carbide, titanium carbide, boron carbide, crystalline aluminum silicates and thorium oxide, and of a size all passing through a 600 mesh sieve and having a Mohs' scale hardness of greater than 6, said surface layer being adapted for frictional engagement with the surface of a fiber-reinforced, hardened organic binder friction composition lining.

11. The metallic mating member of claim 10 wherein a layer of metal selected from the group consisting of silver, copper and alloys of said metals having a melting point of at least 1500° F. and a thermal conductivity at least 40% of that of pure electrolytic copper is bonded between said metallic mating member and said surface layer.

References Cited by the Examiner

UNITED STATES PATENTS

| | | | |
|---|---|---|---|
| 1,374,136 | 4/1921 | Beecher | 106—36 |
| 2,404,598 | 7/1946 | Sachse | 75—206 |
| 2,519,865 | 8/1950 | Wellman | 192—107 |
| 2,581,941 | 1/1952 | Shinn | 188—251 X |
| 2,599,185 | 6/1952 | Lepp | 75—206 X |
| 2,940,556 | 6/1960 | Jensen et al. | 188—251 |
| 3,069,759 | 12/1962 | Grant et al. | |
| 3,143,789 | 8/1964 | Iler | 75—206 X |

DAVID J. WILLIAMOWSKY, *Primary Examiner.*

ROBERT C. RIORDON, *Examiner.*